United States Patent [19]

Okada et al.

[11] Patent Number: 5,412,472
[45] Date of Patent: May 2, 1995

[54] OPTICAL-INTERFERENCE TYPE ANGULAR VELOCITY OR RATE SENSOR HAVING AN OUTPUT OF IMPROVED LINEARITY

[75] Inventors: Kenichi Okada; Ryuji Usui, both of Tokyo, Japan

[73] Assignee: Japan Aviation Electronics Industry Limited, Tokyo, Japan

[21] Appl. No.: 190,354

[22] Filed: Feb. 1, 1994

Related U.S. Application Data

[63] Continuation of Ser. No. 59,665, May 12, 1993.

[51] Int. Cl.[6] .............................................. G01C 19/72
[52] U.S. Cl. ...................................... 356/350; 356/345
[58] Field of Search ............................... 356/350, 345; 250/227.19, 227.27; 385/12, 14

[56] References Cited

U.S. PATENT DOCUMENTS 4,883,358  11/1989  Okada ................................. 356/350
5,048,961  9/1991  Okamoto ............................. 356/350

FOREIGN PATENT DOCUMENTS

0454113  10/1991  European Pat. Off. .
4050717  2/1992  Japan ................................... 356/350

*Primary Examiner*—Samuel A. Turner
*Attorney, Agent, or Firm*—Pollock, VandeSande and Priddy

[57] ABSTRACT

Clockwise and counterclockwise light beams, which have a Sagnac phase difference caused by an angular rate in an optical fiber coil, are combined into interference light, which is converted by a photodetector into an electrical signal. A sine component and a cosine component of the Sagnac phase difference $\Delta\Phi_s$ in the output of the photodetector are detected by first and second synchronous detectors, respectively, and the sine component is used as the fiber optic gyro output and it is provided to a correcting signal generator to produce a correcting signal. The detected cosine component is added by an adder to the correcting signal, and the added output is compared by a differential amplifier with a reference voltage and the resulting error signal is produced. The error signal is applied to an integrating filter, the output of which is used to control the quantity of light to be emitted from a light source or the gain of the photodetector output, forming a feedback loop so that the error signal is reduced to zero.

16 Claims, 9 Drawing Sheets

OPTICAL-INTERFERENCE TYPE ANGULAR VELOCITY OR RATE SENSOR HAVING AN OUTPUT OF IMPROVED LINEARITY

This application is a continuation of Okada application Ser. No. 08/059,665 May 12, 1993.

BACKGROUND OF THE INVENTION

The present invention relates to an optical-interference-type angular VELOCITY OR rate sensor wherein clockwise and counterclockwise light beams (hereinafter referred to as CW and CCW light beams) are passed through an optical path forming at least one loop and the phase difference between the CW and CCW light beams is detected to thereby measure an angular rate applied to the optical path about the axis thereof.

A description will be given, with reference to FIG. 1, of a conventional optical-interference-type angular rate sensor. It must be noted here that both the prior art and the present invention will be described in connection with a fiber optic gyro of the type employing an optical fiber as the above-mentioned optical path.

Light I from a light source 11 passes through an optical coupler 12, a polarizer 13 and an optical coupler 14 and then enters into an optical fiber coil 15 from its opposite ends. CW and CCW light beams which propagate through the optical fiber coil 15 are phase modulated by a phase modulator 16 disposed between one end of the optical fiber coil 15 and the optical coupler 14. The two phase-modulated light beams are combined by the optical coupler 14 into interference light, which is provided via the polarizer 13 to the optical coupler 12 and then branched therefrom to a photodetector 17 for photoelectric conversion.

With no angular rate $\Omega$ applied to the optical fiber coil 15 in its circumferential or peripheral direction, the phase difference between the two light beams in the optical fiber coil 15 is zero ideally, but the application of an angular rate causes a Sagnac phase difference $\Delta\Phi_s$ which is expressed by the following equation:

$$\Delta\Phi_s = 4\pi RL \cdot \Phi/C\lambda$$

where C is the velocity of light, $\lambda$ is the wavelength of light in a vacuum, R is the radius of the optical fiber coil 15 and L is the length of the optical fiber of the optical fiber coil 15.

Based on a reference signal $S_r$ of a frequency $f_m$ from a reference signal generator 24, a phase modulation driver 22 generates a drive signal $S_p$ of the same frequency $f_m$ and applies it to the phase modulator 16. Letting the phase modulation of the CW and CCW light beams by the phase modulator 16 be represented by $P(t) = A\sin\omega_m t$, the photoelectric conversion output $V_p$ of the photodetector 17 can be expressed by the following equation:

$$V_p = (I/2)K_{op}K_{pd}\{1 + \cos\Delta\Phi_s[\Sigma\epsilon_n(-1)^n J_{2n}(X)\cos 2n\omega_m t'] - \sin\Delta\Phi_s[2\Sigma(-1)^n J_{2n+1}(X)\cos(2n+1)\omega_m t']\} \quad (2)$$

$$X = 2A\sin\pi f(\tau)$$

$\Sigma$: summation operator from n=0 to infinity;
A: modulation index;
$\omega_m$: angular frequency of phase modulation ($\omega_m = 2\pi f_m$);

$\tau$: time for the propagation of light through the optical fiber coil 15;
$t'$: $t - \tau/2$;
$\epsilon_n$: 1 for n=0, $\epsilon_n = 2$ for n$\geq$1;
$K_{op}$: optical loss on the emitted light I from the light source 11 which is caused or imposed by the optical path to the photodetector 17 via the optical fiber coil 15;
$K_{pd}$: constant which is determined by a photoelectric conversion coefficient, an amplifier gain and so forth;
I: quantity of light emitted from the light source 11;
$I_o$: maximum quantity of light which reaches the photodetector 17 ($I_o = K_{op} \cdot I$);
$J_n$: Bessel function of the first kind; and
$\Delta\Phi_s$: Sagnac phase difference between the CW and CCW light beams in the optical fiber coil 15.

The output Vp of the photodetector 17 is applied to a synchronous detector 18, wherein the same frequency component as the phase modulation frequency $f_m$, that is, the fundamental harmonic component in Eq. (2), is synchronously detected by the reference signal $S_r$ of the same frequency from the reference signal generator 24. The detected output is applied to a low-pass filter 19, wherein its AC component is cut off, and the DC level corresponding to the fundamental harmonic component (i.e. the component of the frequency $f_m$) in Eq. (2) is taken out with a proper gain, as the output of the fiber optic gyro (hereinafter referred to as an FOG output) at an output terminal 21.

The FOG output $V_1$ is expressed by the following equation:

$$V_1 = I \cdot K_{op} K_{pd} J_1(X) K_{A1} \cdot \sin\Delta\Phi_s \quad (4)$$
$$= K_1 \cdot \sin\Delta\Phi_s$$

where $K_{A1}$ is the total gain of the synchronous detector and the low-pass filter 19.

Hence the input angular rate $\Omega$ can be detected by measuring the output $V_1$ of the low-pass filter 19.

A signal corresponding to the phase difference $\Delta\Phi_s$ could be detected as the FOG output by the synchronous detection of an arbitrary one of the frequency components in Eq. (2), but it is customary in the art to detect the $\sin\Delta\Phi_s$ component (an odd harmonic component or simply called a sine component) which can be detected with the highest sensitivity when the phase difference $\Delta\Phi_s$ is around zero. The detected output of such an arbitrary odd harmonic component can be expressed by changing the suffixed numerals in Eq. (4) to a value representing the selected odd harmonic.

The synchronously detected output $V_1$ of the fiber optic gyro corresponding to the odd harmonic component (the fundamental harmonic component in this example) is a sine function using the phase difference $\Delta\Phi_s$ as a variable, as is evident from Eq. (4) and, therefore, if the phase difference $\Delta\Phi_s$ is sufficiently small, it can be regarded approximately to be equal to the $\sin\Delta\Phi_s$ component. Hence the FOG output $V_1$ given by Eq. (4) exhibits an excellent linearity with respect to the phase difference $\Delta\Phi_s$, but an increase in the phase difference $\Delta\Phi_s$ causes an increase in the linearity error. For example, when the phase difference $\Delta\Phi_s$ is 45°, a 10% linearity error is induced.

Moreover, as is evident from Eq. (4), $K_1$ is a proportional coefficient, and remains unchanged under stable circumferential conditions, but elements forming the coefficient $K_1$ have some temperature coefficients and the input/output gain $K_1$ of the fiber optic gyro, that is, its scale factor varies with temperature. For instance, the first-order Bessel function $J_1(X)$ is relatively stable with respect to a temperature change of the phase modulation index A when the phase modulation index A is chosen such that $X = 1.84$, and the constant $K_{pd}$ and the gain $K_A$ essentially have small temperature coefficients. However, there is a possibility that the optical loss $K_{op}$ varies about 30% when temperature changes in the range from $-20°$ C. to $+70°$ C.

SUMMARY OF THE INVENTION

A first object of the present invention is to provide an optical-interference-type angular rate sensor which yields an output of improved linearity with respect to an input angular rate.

A second object of the present invention is to provide an optical-interference-type angular rate sensor with improved temperature dependence of its scale factor.

According to a first aspect of the present invention, there is provided an optical-interference-type angular velocity or rate sensor wherein light from light source means is branched by branch means into clockwise and counterclockwise light beams for propagation through an optical path forming at least one loop, the clockwise and counterclockwise light beams, after having propagated through the optical path, are caused by interference means to interfere with each other, the clockwise and counterclockwise light beams are phase modulated by phase modulator means disposed in series between the branch means and one end of the optical path, the intensity of the interference light is detected as an electrical signal by photodetector means, and the sine component of the Sagnac phase difference $\Delta\Phi_s$ which is caused by an angular rate applied to the optical path around its axis is demodulated by first demodulator means from the electrical signal to obtain an output of the angular rate sensor whereby the angular rate is detected, the optical-interference-type angular rate sensor including: second demodulator means for demodulating the cosine component of the phase difference $\Delta\Phi_s$ from the electrical signal; means for generating a scale factor stabilizing signal on the basis of the cosine component from the second demodulator means; correcting signal generator means for generating a correcting signal for improving the linearity of the output of the angular rate sensor, the correcting signal being generated on the basis of a monomial or polynomial (hereinafter also referred to as "integral expression" which is a generic term representing a monomial and a polynomial) in which the sine component from the first demodulator means is used as a variable; adder means for adding the correcting signal to the scale factor stabilizing signal; reference voltage generating means for generating a reference signal; comparator means for comparing the output of the adder means with the reference voltage signal and for generating an error signal; and feedback loop means for controlling the intensity of the interference light to the photodetector or the level of the electric signal output from the photodector means so that the error signal is reduced to zero.

According to a second aspect of the present invention, there is provided an optical-interference-type angular rate sensor wherein light from light source means is branched by branch means into clockwise and counterclockwise light beams for propagation through an optical path forming at least one loop, the clockwise and counterclockwise light beams, after having propagated through the optical path, are caused by interference means to interfere with each other, the clockwise and counterclockwise light beams are phase modulated by phase modulator means disposed between the branch means and one end of the optical path, the intensity of the interference light is detected as an electrical signal by photodetector means, and the sine component of the Sagnac phase difference $\Delta\Phi_s$ which is caused by an angular rate applied to the optical path around its axis is demodulated by sine component demodulator means from the electrical signal to thereby detect the angular rate, the optical-interference-type angular rate sensor including: first and second cosine component demodulator means for demodulating first and second cosine components of the phase difference from the electrical signal; first subtractor means for calculating the difference between the first and second cosine components; modulation control means for controlling the modulation index of the phase modulator means on the basis of the output of the first subtractor means so that the first and second cosine components are equal to each other; cosine component combiner means for combining the first and second cosine components at a predetermined ratio into a composite cosine component; comparator means for comparing a signal corresponding to the composite cosine component with a predetermined value and for generating an error signal; and feedback loop means for controlling the intensity of the interference light to the photodetector means or the level of the electrical signal output from the photodetector means so that the error signal is reduced to zero.

DESCRIPTION OF THE PREFERRED EMBODIMENTS

Figure 1:
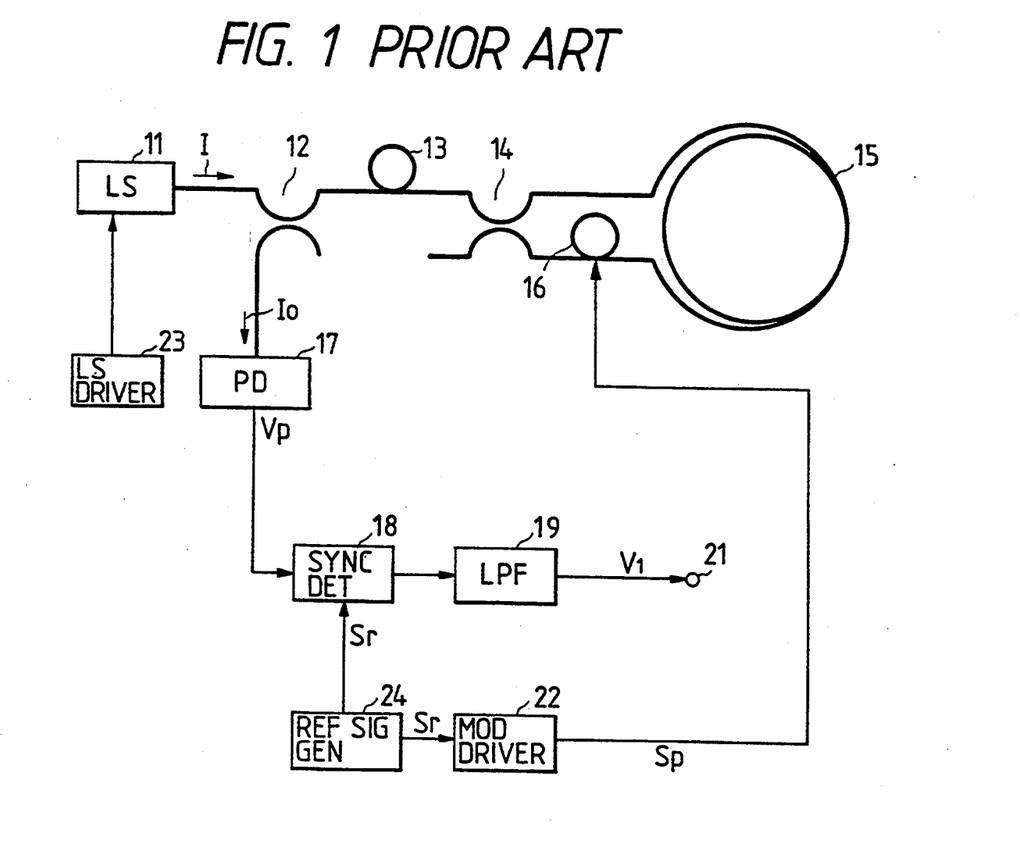
FIG. 1 is a block diagram showing a conventional optical-interference-type angular rate sensor.
Figure 2:
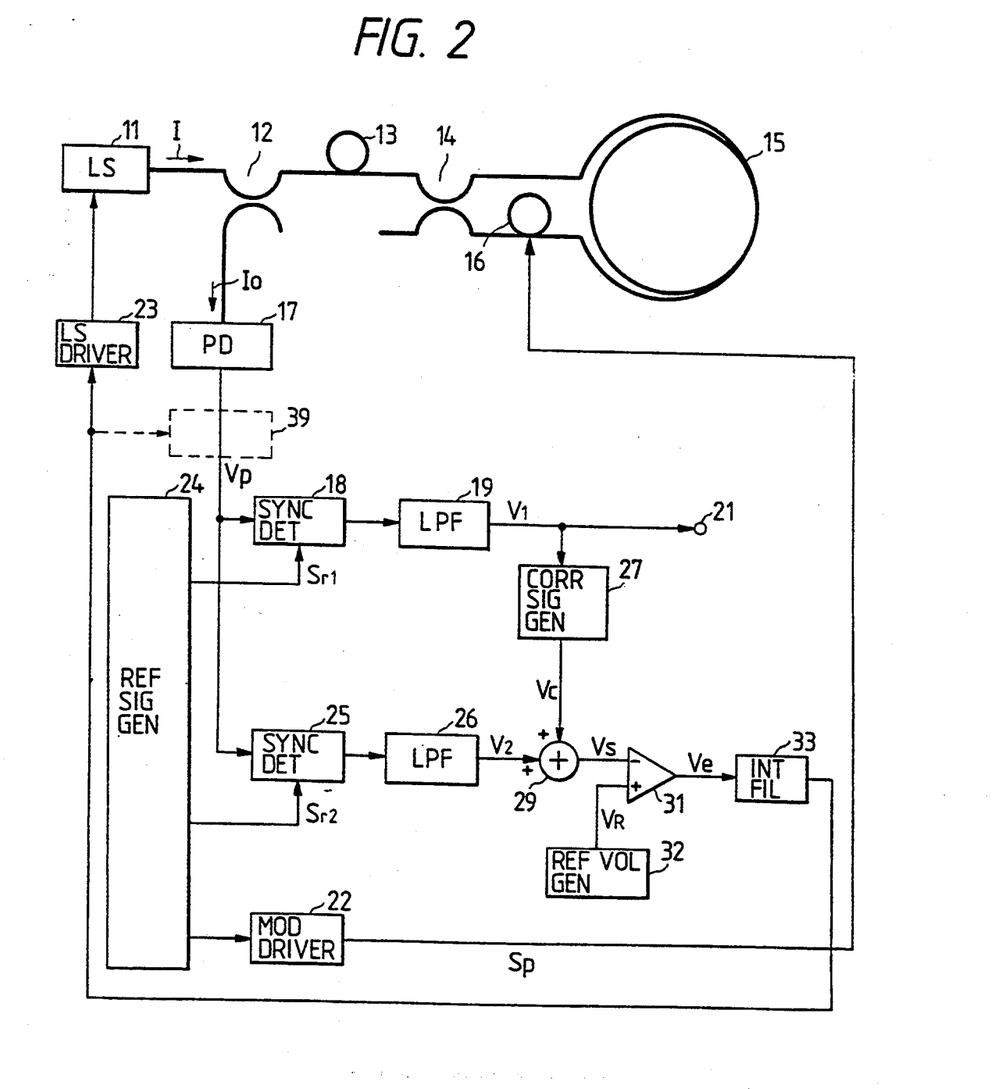
FIG. 2 is a block diagram illustrating an embodiment of the present invention.

FIG. 2 illustrates in block form an embodiment of the present invention, in which the parts corresponding to those in FIG. 1 are identified by similar reference numerals. A photoelectric conversion signal Vp from the photodetector 17 is applied to the synchronous detector 18 forming first demodulator means as in the prior art, wherein a component of the same frequency as the phase modulation frequency $f_m$ (i.e. the fundamental harmonic component) is synchronously detected by a reference signal $S_{r1}$ from the reference signal generator 24. The thus detected output is fed to the low-pass filter 19, wherein a DC level signal corresponding to the level of the fundamental harmonic component is extracted, and it is output with a predetermined gain, as the FOG output $V_1$, to the terminal 21. The FOG output $V_1$ is expressed by Eq. (4). The photoelectric conversion signal Vp is also applied to a synchronous detector 25 forming second demodulator means, wherein a frequency component twice higher than the phase modulation frequency $f_m$ is synchronously detected by a reference signal $S_{r2}$ of the same frequency $2f_m$ from the reference signal generator 24 and the detected frequency component is extracted, by a low-pass filter 26, as a DC component with a predetermined gain. The output $V_2$ of the low-pass filter 26 obtained therefrom at this time is a $\cos\Delta\Phi_s$ component which is expressed by the following equation:

$$V_2 = I \cdot K_{op}K_{pd}J_2(X)K_{A2} \cdot \cos\Delta\Phi_s \qquad (5)$$
$$= I_o \cdot K_2\cos\Delta\Phi_s,$$

where $K_{A2}$ is the total gain of the synchronous detector 25 and the low-pass filter 26 and $K_2 = K_{pd}\cdot J_2(X)\cdot K_{A2}$. The thus detected cosine component, that is, the output $V_2$, is used as a signal to stabilize the scale factor.

In this embodiment, in order that a linearity error, $\epsilon = I_o K_1(\sin\Delta\Phi_s - \Delta\Phi_s)$, of the FOG output $V_1$, expressed by Eq. (4), with respect to the phase difference $\Delta\Phi_s$ may be reduced to zero, a correcting signal Vc is generated by a correcting signal generator 27 on the basis of the output $V_1$ and is added with the output $V_2$ of the low-pass filter 26 in an adder 29. The output Vs of the adder 29 is expressed by the following equation:

$$Vs = V_2 + Vc \qquad (6)$$
$$= I_o K_2 \cdot \cos\Delta\Phi_s + Vc.$$

The correcting signal Vc is given by the following polynomial of n-th degree of the sine component, namely, the FOG output $V_1$ in which the sine component is used as a variable, where n = 1, 2, 3:

$$Vc = C_0 + C_1V_1 + C_2V_1^2 + C_3V_1^3 + \ldots + C_kV_1^k. \qquad (7)$$

The output Vs of the adder 29 is supplied to a differential amplifier 31, wherein it is differentially operated with a reference voltage $V_R$ from a reference voltage generator 32. The error output Ve of the differential amplifier 31 is given by the following equation:

$$Ve = V_R - Vs \qquad (8)$$
$$= V_R - (I_oK \cdot \cos\Delta\Phi_s + Vc),$$

where it is assumed that $K_1$ and $K_2$ are pre-adjusted so that $K = K_1 = K_2$.

The output Ve of the differential amplifier 31 is applied to an integrating filter 33. The output of the integrating filter 33 is provided to a light source driver 23 which controls the quantity of light which is emitted from the light source 11. Thus, the quantity of light I from the light source 11 is controlled. Assuming that $V_R = I_oK + K_R$ and $C_0 = 0$ are set at an initial stage, the output Ve of the differential amplifier 31 is zero when no angular rate is being applied, that is, when the phase difference $\Delta\Phi_s$ between the CW and CCW light beams in the optical fiber coil 15 is zero. Suppose that the quantity of light $I_o$ reaching the photodetector 17 has decreased due to an ambient temperature change. As a result, the output Ve becomes a positive voltage on the basis of Eq. (8). The positive voltage is applied to the integrating filter 33, which in turn generates a positive integrated voltage. The light source driver 23 is pre-adjusted to increase the quantity of light I of the light source 11 on the basis of the positive integrated voltage and is controlled so that the input to the integrating filter 33, that is, the output Ve of the differential amplifier 31 is always zero. In consequence, the following equation holds:

$$V_R = I_oK \cdot \cos\Delta\Phi_s + Vc \qquad (9)$$

The FOG output $V_1$ that is provided by the operation of the aforementioned scale factor stabilizing system is expressed by the following equation on the basis of Eqs. (4) and (9):

$$V_1 = \{(K_R - Vc)/\cos\Delta\Phi_s\}\sin\Delta\Phi_s \qquad (10)$$

Based on Eq. (10), the linearity error Li of the scale factor is given by the following equation:

$$Li = \{[(K_R - Vc)/\cos\Delta\Phi_s]\cdot\sin\Delta\Phi_s - K_R\Delta\Phi_s\} \div (K_R\Delta\Phi_s) \times 100\%. \qquad (11)$$

Figure 3A:
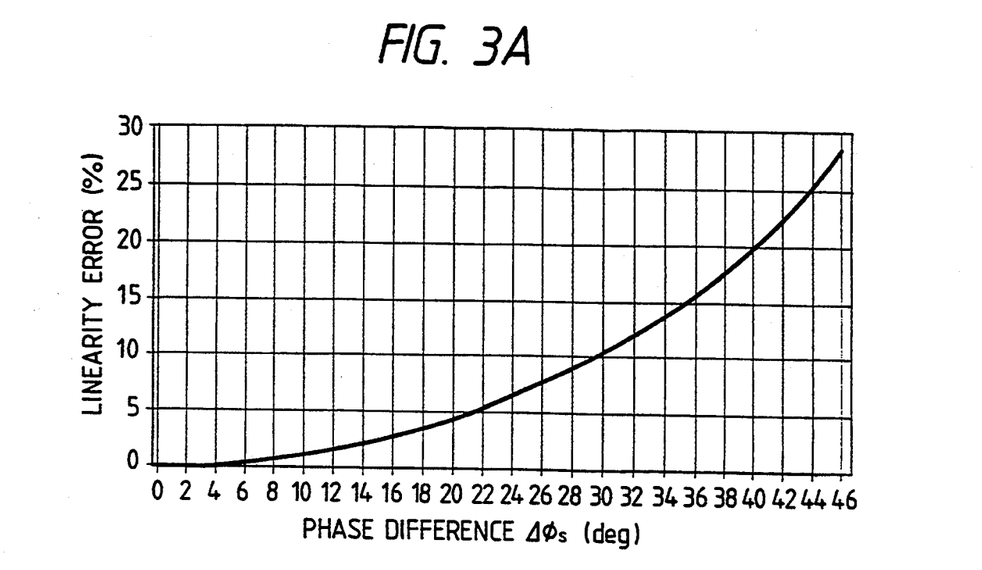
FIG. 3A is a graph showing an example of a scale factor linearity error of the conventional optical-interference-type angular rate sensor.
Figure 3B:
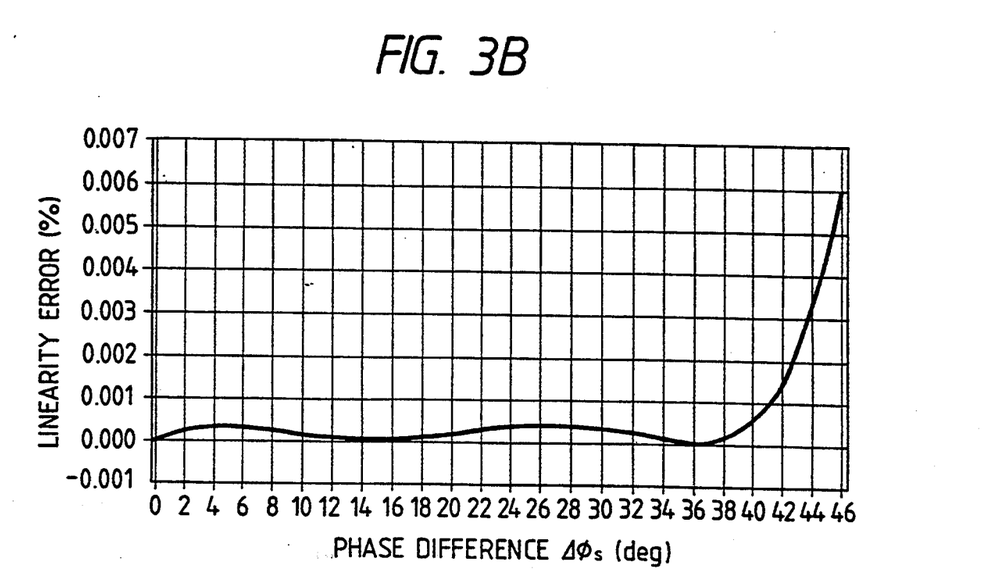
FIG. 3B is a graph showing a scale factor linearity error of the embodiment according to the present invention.

In Eq. (11), if the correcting signal Vc is zero, the Sagnac phase difference $\Delta\Phi_s$ increases, the linearity error increases, as seen from FIG. 3A which is a graph showing the linearity error obtained by calculating the linearity LI of the FOG output $V_1$ by use of Eq. (11) when the correcting signal Vc is zero. To improve this linearity error, the respective coefficients $C_0$ to $C_k$ for respective terms in Eq. (7) expressing the correcting signal Vc are calculated by the least square method so that the numerator in Eq. (11) becomes zero with respect to the Sagnac phase difference $\Delta\Phi_s$, and the correcting signal Vc is generated by use of these calculated coefficients. FIG. 3B is a graph showing the linearity error obtained by calculating the linearity Li of the FOG output $V_1$ detected by the angular velocity sensor having the composition shown in FIG. 2. In this case, the FOG output $V_1$ was produced and detected by generating the correcting signal Vc by use of data of the FOG outputs $V_1$ produced when the Sagnac phase difference $A\Delta\Phi_s$ was within the range of 0° to 40° and by finding the coefficients $C_1$-$C_4$ in Eq. (7) which was modified to a polynomial of the fourth degree of $V_1$ ($C_0 = 0$) and substituting the found coefficients for the modified Eq. (7).

Figure 4:
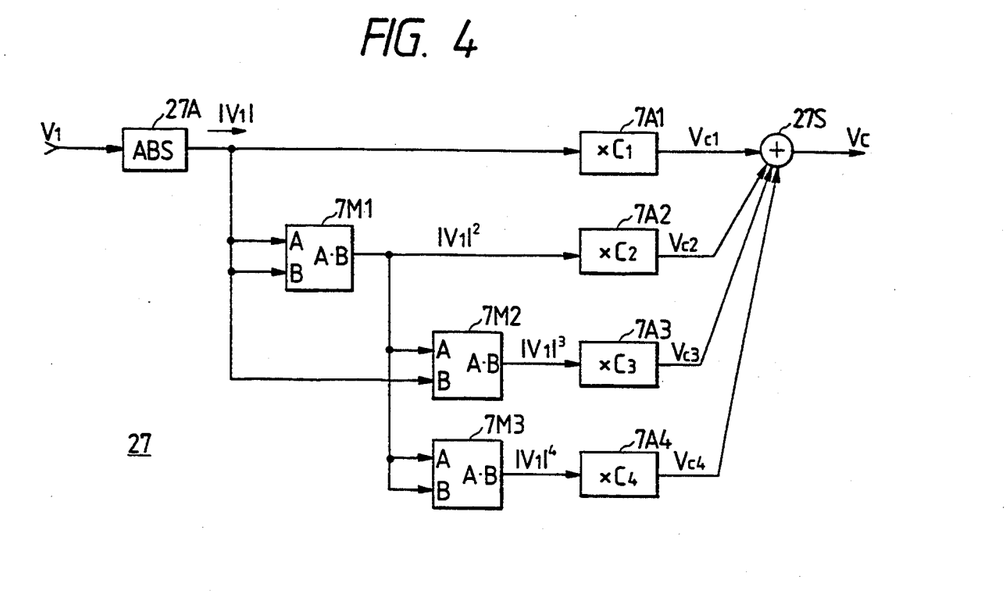
FIG. 4 is a block diagram illustrating a specific operative example of a correcting signal generator 27 in FIG. 2.

FIG. 4 illustrates in block form a specific operative example of the correcting signal generator 27 which generates the correcting signal Vc in the case where $C_0 = 0$ and $k = 4$ in Eq. (7). At first, the signal $V_1$ is rendered by an absolute value circuit 27A into the form of an absolute value. While in this example the value of the signal $V_1$ is changed into the corresponding absolute value and made independent of the polarity of the input angular rate, the correcting signal Vc could be produced without using such an absolute value representation. In this instance, however, to keep substantially the same accuracy of correction as is obtainable with this example, coefficients of higher order, that is, more multiplier means, are needed. The absolute value output $/V_1/$ is fed to an amplifier 7A1, wherein it is amplified by a factor of $C_1$ to provide a first-order correcting signal $V_{c1}=C_1/V_1/$. The absolute value output $/V_1/$ is also squared by a multiplier 7M1 and is further amplified by a factor of $C_2$ in an amplifier 7A2, providing a second-order correcting signal $V_{c2}=C_2/V_1/^2$. A multiplier 7M2 multiplies the output of the multiplier 7M1 and the output of the absolute value circuit 27A, and the multiplied output is further amplified by a factor of $C_3$ in an amplifier 7A3 to provide a third-order correcting signal $V_{c3}=C_3/V_1/^3$, A multiplier 7M3 squares the output of the multiplier 7M1 and the squared output is amplified by a factor of $C_4$ in an amplifier 7A4 to provide a fourth-order correcting signal $V_{c4}=C_4/V_1/^4$. These correcting signals Vc1 through Vc4 are added together by an adder 27S and the added output is provided as the linearity correcting signal Vc. In this case, the gains $C_1$, $C_2$, $C_3$ and $C_4$ of the amplifiers 7A1, 7A2, 7A3 and 7A4 are set to the same values as those of the coefficients in Eq. (7).

Incidentally, the respective coefficients of the correcting signal used to obtain the graph of FIG. 3B are as follows:

$C_1 = -0.000109$
$C_2 = 0.03344$
$C_3 = -0.000038$
$C_4 = 0.0000268$. The reference voltage $V_R$ is set to 10V. By adding the correcting signal Vc to the signal $V_2$ of an even harmonic component of the output from the photodetector 17 as referred to above, the linearity can be improved within 0.001% (within the range of $\Delta\Phi_s=0°$ to 40°). While in the above description the output of the integrating filter 33 is fed back to the light source driver 23, it is also possible to obtain the same results as described above by feeding back the output of the integrating filter 33 to an automatic gain control circuit 39 provided at the output side of the photodetector 17 to control the gain $K_{pd}$ in Eq. (2).

In the FIG. 2 embodiment the same frequency component as the phase modulation frequency $f_m$ is used as the FOG output (i.e. the sine component output) $V_1$, but other odd harmonic components such as third, fifth, ... harmonic components may also be used. Moreover, the second harmonic component used as the cosine component output $V_2$ may also be replaced with fourth, sixth, ... and other even harmonic components. Although in the above description the output $V_2$ is extracted by the synchronous detector 25, it is also possible to selectively extract a second or higher even harmonic component from the output of the photodetector 17 by a band-pass filter and use the filter output as the output $V_2$ after rendering it into DC form.

Figure 5:
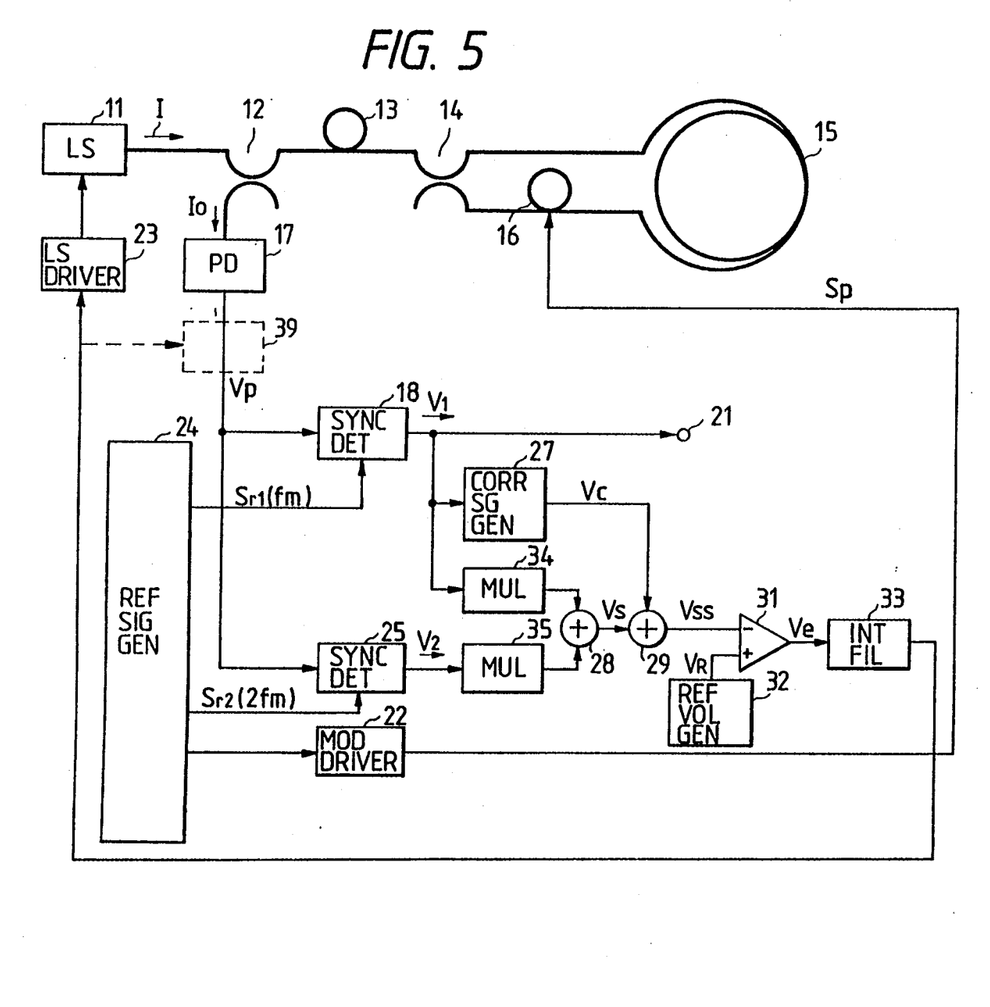
FIG. 5 is a block diagram illustrating another embodiment of the present invention.

The FIG. 2 embodiment has been described in connection with the case of employing only one cosine component (i.e., even harmonic component) to stabilize the scale factor, but another method for suppressing the FOG output variation which is caused by a change in the quantity of light $I_o$ is disclosed in, for example, Okada U.S. Pat. No. 4,883,358. According to this method, predetermined sine and cosine components in Eq. (2) are synchronously detected, the squared sum of which is produced to generate the signal Vs such that $Vs(\sin^2\Delta\Phi_s+\cos^2\Delta\Phi_s)=Vs$ and the quantity of light I which is emitted from the light source 11 is controlled so that the signal Vs reaches a fixed reference level. FIG. 5 shows the application of this method to the embodiment of FIG. 2.

In FIG. 5 the outputs $V_1$ and $V_2$ from the synchronous detectors 18 and 25 (which are assumed to include the low-pass filters corresponding to those 19 and 26 in FIG. 2, respectively) are squared by multipliers 34 and 35 and then added together by an adder 28. The output Vs of the adder 28 is given by the following equation:

$$VS=V_1^2+V_2^2. \qquad (12)$$

As described previously with respect to the FIG. 2 embodiment, by setting the respective gains $K_{A1}$ and $K_{A2}$ such that $K=K_{A1}J_1(X)K_{pd}=K_{A2}J_2(X)K_{pd}$, Eq. (12) becomes as follows:

$$Vs=I_o^2K^2(\sin^2\Delta\Phi_s+\cos^2\Delta\Phi_s)=I_o^2K^2. \qquad (13)$$

The output Vs of the adder 28 is applied to the adder 29, wherein it is added to the correcting signal Vc expressed by Eq. (7) to produce a signal Vss. The output Vss of the adder 29 is expressed by the following equation, using Eq. (13).

$$Vss=I_o^2.K^2+Vc \qquad (14)$$

The output Vss of the adder 29 is applied to the differential amplifier 31, wherein it is differentially operated with the reference voltage $V_R$ from the reference voltage generator 32. The error output Ve of the differential amplifier 31 is given by the following equation:

$$Ve=V_R-Vss=V_R-I_o^2K^2-Vc. \qquad (15)$$

The output Ve of the differential amplifier 31 is applied to the integrating filter 33 and, as is the case with the FIG. 2 embodiment, the integrated output is provided to the light source driver 23 to control the quantity of light I that is emitted from the light source 11. Suppose that $V_R=I_o^2.K^2$ and $C_0=0$ are set at an initial stage. When no angular rate is being applied to the optical fiber coil 15, that is, when the phase difference $\Delta\Phi_s$ between the CW and CCW light beams in the optical fiber coil 15 is zero, Vc in Eq. (15) is zero, and hence Ve by Eq. (15) is zero.

Now, let it be assumed that the quantity of light $I_o$ reaching the photodetector 17 has been reduced by a change in the ambient temperature. In this case, the error signal Ve becomes a positive voltage on the basis of Eq. (15). Suppose that this positive voltage is applied to the integrating filter 33 to generate a positive integrated voltage. Assuming that the light source driver 23 is so adjusted as to increase the quantity of light from the light source 11 with the positive integrated voltage, it is controlled so that the input to the integrating filter 33, that is, the output Ve from the differential amplifier 31, is always zero. As a result, the following equation holds:

$$V_R=I_o^2.K^2-Vc. \qquad (16)$$

The FOG output $V_1$, which is provided by operating such a quantity-of-light control circuit to stabilize the scale factor, is given by the following equation on the basis of Eqs. (4) and (16).

$$V_1 = I_o \cdot K \cdot \sin\Delta\Phi_s \qquad (17)$$
$$= \sqrt{V_R - V_c} \cdot \sin\Delta\Phi_s$$

Based on Eq. (17), the linearity error Li is given as follows:

$$Li = \qquad (18)$$
$$(\sqrt{V_R - V_c} \cdot \sin\Delta\Phi_s - \sqrt{V_R} \cdot \Delta\Phi_s)/(\sqrt{V_R} \cdot \Delta\Phi_s) \times 100\%$$

Figure 6A:
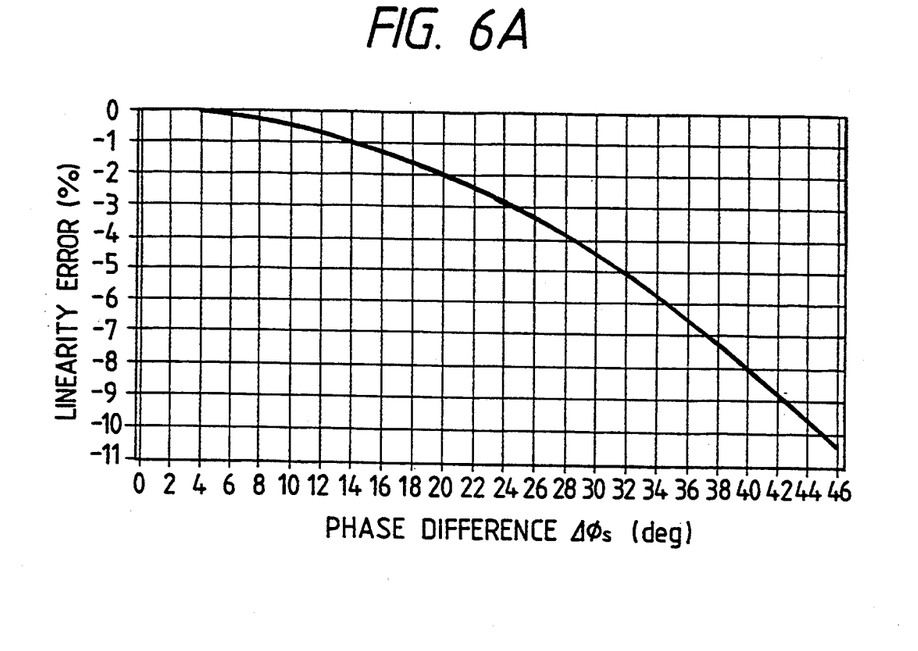
FIG. 6A is a graph showing an example of the linearity error that occurs when no correcting signal is read.
Figure 6B:
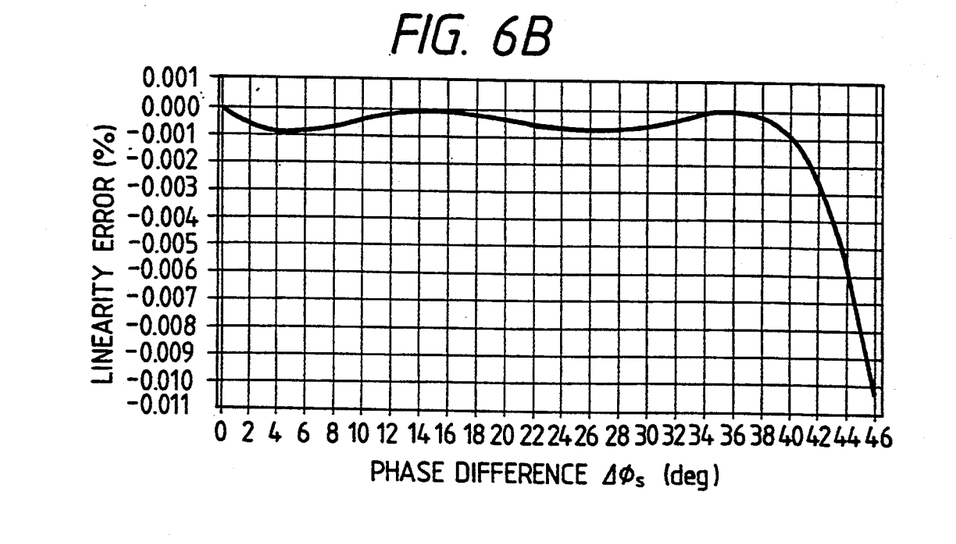
FIG. 6B is a graph showing the improved linearity achieved by use of a correcting signal in accordance with the present invention.

FIG. 6A is a graph showing the linearity error in the case where the correcting signal Vc is zero in Eq. (18). In the generation of the correcting signal Vc to improve the linearity, the respective coefficients $C_0$ through $C_k$ in Eq. (17) are calculated by the least square method so that the numerator in Eq. (18) may be zero with respect to the Sagnac phase difference $\Delta\Phi_s$, as in the case of the FIG. 2 embodiment. FIG. 6B is a graph showing the linearity error improved by the correcting signal Vc produced with the coefficients $C_0$ to $C_4$ of up to fourth order through utilization of data of the FOG output $V_1$ obtained in the case of the Sagnac phase difference $a\Delta\Phi_s$ being within the range of from 0° to 40°. Incidentally, the respective coefficients of the correcting signal which are determined by the least square method and used to obtain the graph of FIG. 6B are as follows:

$C_0 = 0$
$C_1 = 0.000997$
$C_2 = -0.3324$
$C_3 = 0.01106$
$C_4 = -0.02808$. The reference voltage $V_R$ is set to 3.162 V. Also in the case where the conventional scale factor stabilizing method disclosed in the afore-mentioned Okada U.S. patent is applied to the embodiment of FIG. 2, the linearity error can be improved within 0.001% (within the range of $\Delta\Phi_s = 0°$ to 40°). Although the FIG. 5 embodiment has also been described in connection with the case where the output of the integrating filter 33 is fed back to the light source driver 23, it is also possible to obtain the same results as described above by feeding the integrated output back to the automatic gain control circuit 39 inserted at the output side of the photodetector 17 to control the gain (part of $K_{pd}$) in Eq. (2).

Figure 7:
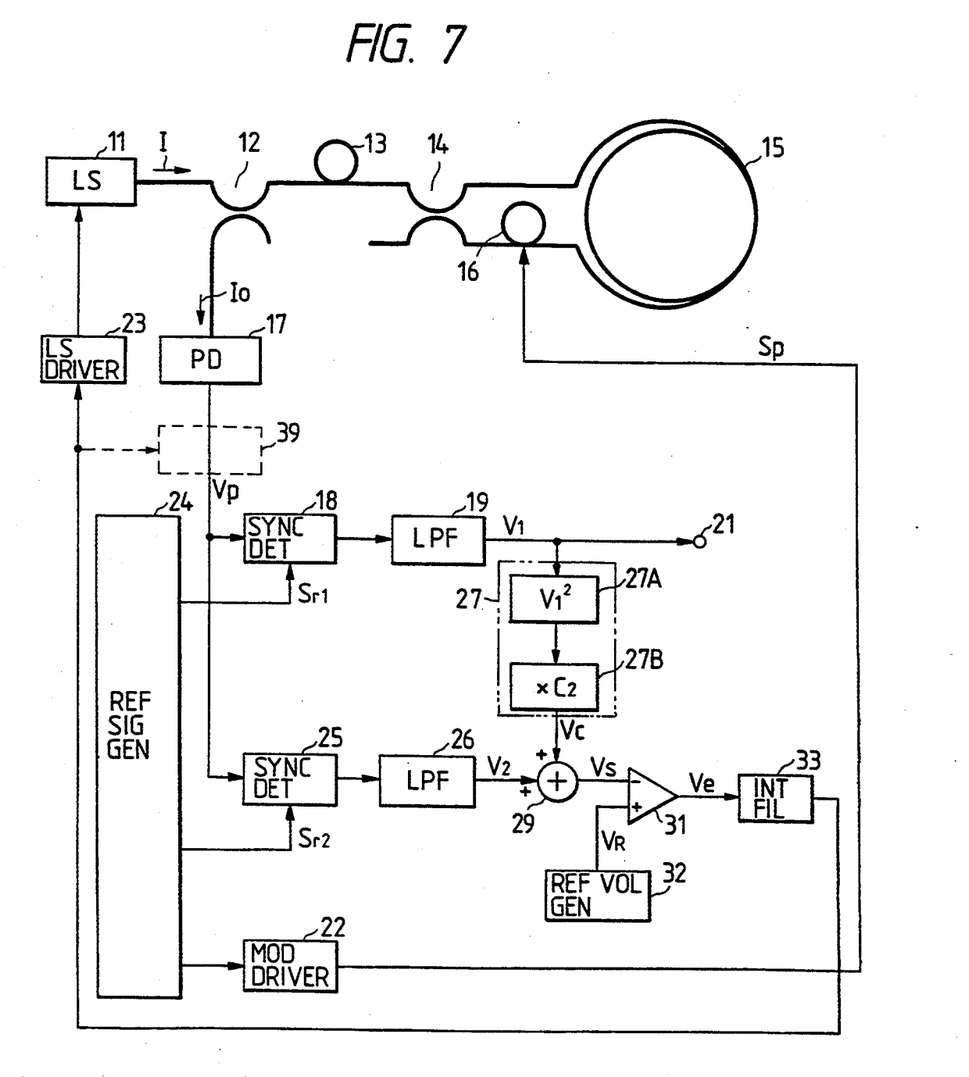
FIG. 7 is a block diagram illustrating another embodiment of the present invention.

FIG. 7 illustrates a modified form of the FIG. 2 embodiment, in which the generation of the correcting signal Vc by the correcting signal generator 27 is simplified. Based on the fact that, of the aforementioned coefficients $C_0$ to $C_4$, the second-order coefficient $C_2$ is remarkably large as can be seen from their concrete values which provided the results depicted in FIGS. 3B and 6B, the correcting signal is generated in the form of $Vc = C_2 V_1^2$, that is, by a with the other coefficients set to zeros in Eq. (7).

The correcting signal generator 27 is made up of a multiplier 27A and an amplifier 27B. The output $V_1$ of the low-pass filter 19 is squared by the multiplier 27A and is amplified by a factor of $C_2$ in the amplifier 27B, and the amplified output $Vc = C_2 V_1^2$ is added to the output $V_2$ of the low-pass filter 26. The output Vs of the adder 29 is expressed by the following equation:

$$Vs = V_2 + C_2 V_1^2 = V_2 + Vc. \qquad (19)$$

By setting the gains $K_{A1}$ and $K_{A2}$ such that $K = K_{A1} J_1(X) K_{pd} = K_{A2} J_2(X) K_{pd}$, Eq. (19) is expressed by the following equation, using Eq. (5):

$$Vs = I_o K(C_2 I_o K \sin^2\Delta\Phi_s + \cos\Delta\Phi_s) \qquad (20)$$

The output Vs of the adder 29 is compared, by the differential amplifier 31, with the reference voltage $V_R$ available from the reference voltage generator 32, by which the error signal Ve is yielded. Since the negative feedback loop operates so that the error signal Ve is reduced to zero, the following equation holds:

$$V_R = I_o K(C_2 I_o K \sin^2\Delta\Phi_s + \cos\Delta\Phi_s) \qquad (21)$$

By setting $I_o K = Z$ and solving Eq. (21) with respect to Z, the following equation is obtained:

$$Z = \{-1 + (1 + 4C_2 V_R \tan\Delta\Phi_s)^{\frac{1}{2}}\}/(2C_2 \tan\Delta\Phi_s \cdot \sin\Delta\Phi_s) \qquad (22)$$

By substituting Eq. (22) for $I_o K_{op} K_{pd} J_1(X) K = I_o K = Z$ in Eq. (4), the FOG output $V_1$ is expressed by the following equation:

$$V_1 = Z \sin\Delta\Phi_s \qquad (23)$$
$$= 2V_R \tan\Delta\Phi_s/\{1 + (1 + 4C_2 V_R \tan\Delta\Phi_s)^{\frac{1}{2}}\}.$$

Eq. (23) has nothing to do with the quantity of light $I_o$, and hence the scale factor is stabilized with respect to a temperature change. Furthermore, the linearity is also higher in accuracy than in the case of approximating the FOG output by $\tan\Delta\Phi_s$ alone, since $\tan\Delta\Phi_s$ is corrected by the denominator in Eq. (23) with an appropriate selection of the value $C_2$. The linearity error Li of the FOG output is given by the following equation:

$$Li = \{2\tan\Delta\Phi_s/[1 + (1 + 4C_2 V_R \tan\Delta\Phi_s)^{\frac{1}{2}}] - \Delta\Phi_s\} \div \Delta\Phi_s \times 100\%. \qquad (24)$$

The coefficient $C_2$ is computed such that the linearity error is minimum within a predetermined range of the phase difference, and the coefficient is set as the gain of the amplifier 27B in FIG. 7.

In the FIG. 7 embodiment the component of the same frequency as the phase modulation frequency $f_m$ is extracted, as the $\sin\Delta\Phi_s$ component, by synchronous detection, but other odd harmonic components such as the third, fifth, ... harmonic component may also be extracted. Moreover, the second harmonic component used as the $\cos\Delta\Phi_s$ component may also be replaced with other even harmonic components such as fourth, sixth, ... harmonic components. The $\cos\Delta\Phi_s$ component need not always be extracted by the synchronous detector 25 but instead it may also be obtained by extracting a desired even harmonic component from the output of the photodetector 17 through use of a filter and rendering the detected output into DC form. Although in the above description only the second-degree term in Eq. (7) is used for generating the correcting signal Vc, one of the other terms can be used. For example, in the case where the accuracy of correction may be sacrificed to some extent, the use of the first-degree term $C_1 V$ permits the formation of the correcting signal generator 27 by only an amplifier and makes it possible to manufacture the sensor at low cost.

Figure 8:
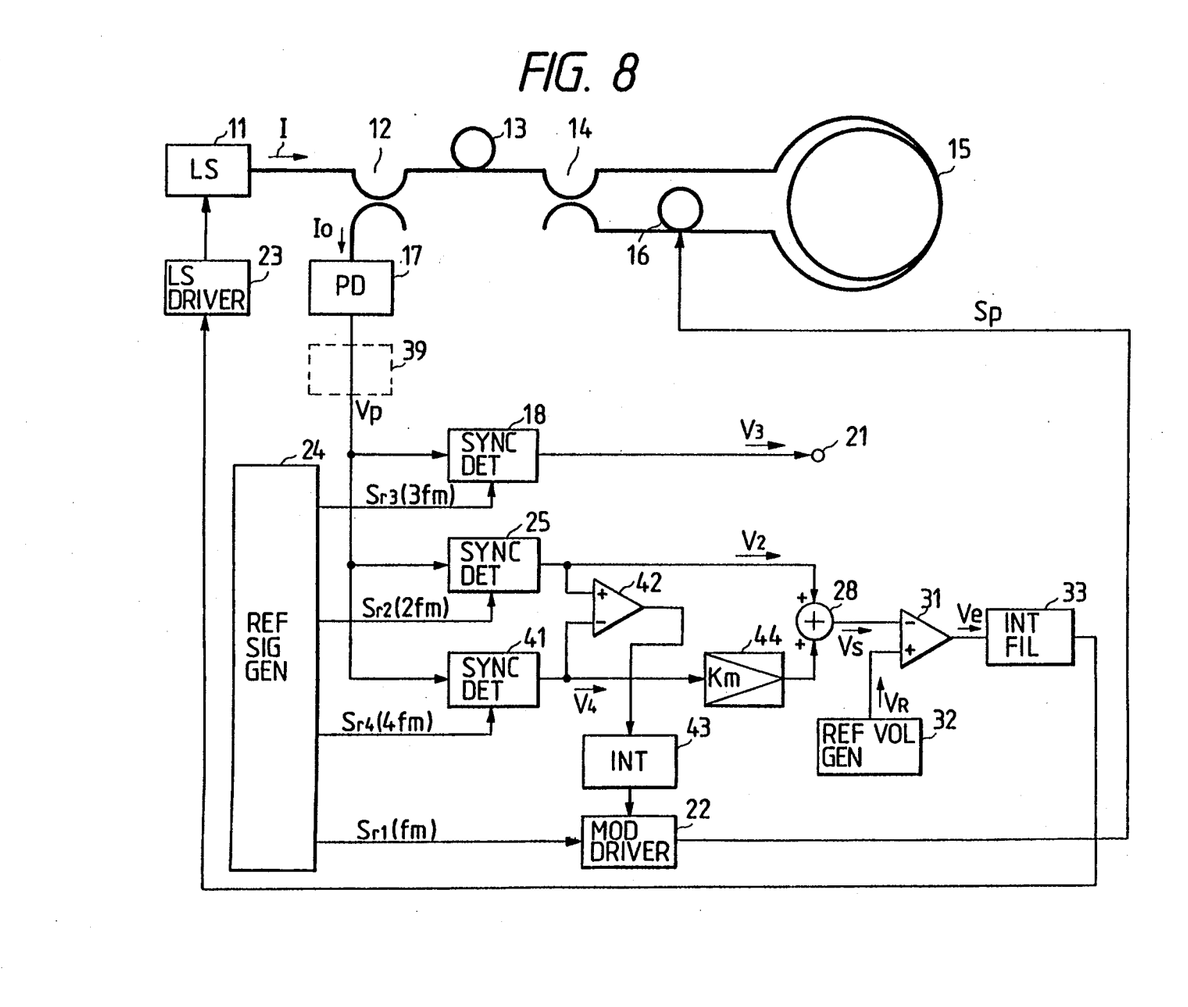
FIG. 8 is a block diagram illustrating an embodiment according to the second aspect of the present invention.

FIG. 8 illustrates an embodiment according to the second aspect of the present invention. In this embodiment which utilizes a method disclosed in Japanese Patent Application Laid Open No. 62-12811, a third harmonic component is extracted, as the sine component (an odd harmonic component), by the synchronous detector 18 to obtain the FOG output, and at the same time, second and fourth harmonic components are extracted, as the cosine components (even harmonic components), by synchronous detectors 25 and 41 and these even harmonic components are used to stabilize the Bessel function contained in the odd harmonic component and then the scale factor is stabilized by following the present invention.

A third harmonic component of the phase modulation frequency $f_m$ is converted into a DC signal by the synchronous detector 18 including a low-pass filter using the reference signal $S_r$ from the reference signal generator 24. The output DC signal corresponding to the third harmonic component is provided, with a proper gain, as the FOG output $V_3$ to the output terminal 21. The FOG output $V_3$ is expressed by the following equation:

$$V_3 = I \cdot K_{op} K_{pd} J_3(X) K_{A3} \cdot \sin\Delta\Phi_s \qquad (25)$$
$$= K_3 \cdot \sin\Delta\Phi_s,$$

where $K_{A3}$ is the gain of the electrical circuit.

Figure 9:
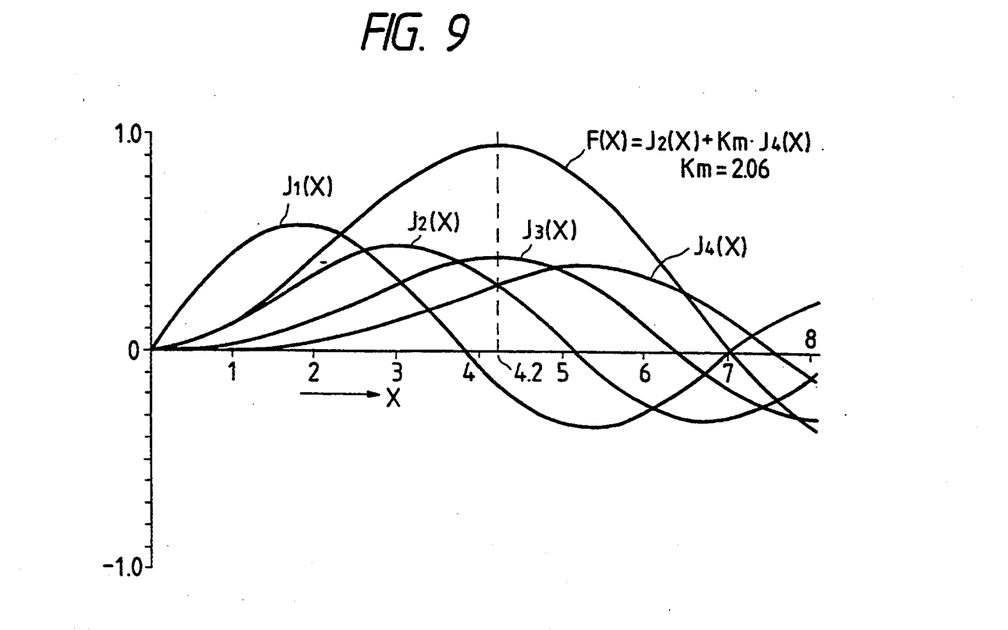
FIG. 9 is a graph showing Bessel functions.

Incidentally, the proportional coefficients (or amplitudes) $K_1$ and $K_3$ of the sine components of odd harmonic components which are obtained by synchronous detection as indicated by Eqs. (4) and (25) are dependent on the value of the variable X of the Bessel function as mentioned previously. Hence, in the above-mentioned Japanese Patent Application Laid Open No. 62-12811 an automatic control loop is formed which controls the modulation index A in the phase modulator 16 so that Bessel functions $J_2(X)$ and $J_4(X)$ are essentially equal to each other, that is, the second and fourth harmonic components in the output of the photodetector 17 are essentially equal to each other, by performing the phase modulation at the intersection (X=4.2) of the Bessel functions $J_2(X)$ and $J_4(X)$ where the Bessel function $J_3(X)$ is maximum, as shown in FIG. 9. This will hereinafter be described.

At first, the second harmonic component of the phase modulation frequency in the output of the photodetector 17, expressed by Eq. (2), is synchronously detected by the synchronous detector 25 (including a low-pass filter) with a reference signal $S_{r2}$ of a frequency $2f_m$ and the fourth harmonic component is synchronously detected by the synchronous detector (including a low-pass filter) 41 with a reference signal $S_{r4}$ of a frequency $4f_m$. The respective outputs $V_2$ and $V_4$ converted by the synchronous detection into DC levels are expressed by the following equations:

$$V_2 = I \cdot K_{op} K_{pd} J_2(X) K_{A2} \cdot \cos\Delta\Phi_s \qquad (26)$$
$$= K_2 \cdot \cos\Delta\Phi_s,$$

$$V_4 = I \cdot K_{op} K_{pd} J_4(X) K_{A4} \cdot \cos\Delta\Phi_s \qquad (27)$$
$$= K_4 \cdot \cos\Delta\Phi_s,$$

where $K_{A2}$ and $K_{A4}$ are gains of electrical circuits.

Next, the output $V_2$ of the synchronous detector 25 is fed to a non-inverting input side of a differential amplifier 42 and the output $V_4$ of the synchronous detector 41 is fed to an inverting input side of the differential amplifier 42. The output of the differential amplifier 42 is applied to an integrator 43. The phase modulation driver 22 has a construction such that it increases the modulation index A and consequently the value X by increasing, on the basis of a positive signal from the integrator 43, the voltage of the modulator drive signal $S_p$ of the drive frequency $f_m$ which is applied to the phase modulator 16, and it decreases the modulation index A and consequently the value X by decreasing, on the basis of a negative signal from the integrator 43, the voltage of the modulator drive signal $S_p$ of the drive frequency $f_m$ which is applied to the phase modulator 16. The modulation driver 22 constitutes the above-mentioned automatic control loop. Thus, in this embodiment the voltage of the modulator drive signal $S_p$ which is fed to the phase modulator 16 is controlled by the modulator driver 22 so that when the output of the differential amplifier 42 is zero, that is, when $V_2=V_4$ (the coefficients $K_2$ and $K_4$ being pre-adjusted so that they are equal to each other), the Bessel functions of the first kind $J_2(X)$ and $J_4(X)$ take the same value, that is, the value X is about 4.20.

The value of the Bessel function $J_3(X)$ can be stabilized by fixing the value X as mentioned above, but the optical loss $K_{op}$ in Eq. (25) which expresses the FOG output $V_3$ is likely to vary around 30% with a temperature change within the range of $-20°$ C. to $+70°$ C. In view of this, according to the present invention, the second and fourth harmonic component outputs $V_2$ and $V_4$ of the synchronous detectors 25 and 41 are added at a predetermined ratio and the quantity of light I that is emitted from the light source 11 or the gain of the output from the photodetector 17 is controlled so that the added output (hereinafter referred to as a composite cosine component) becomes equal to the reference voltage. That is, the synchronous detector outputs $V_4$ is amplified by a factor of $K_m$ in an amplifier 44 and is then added to the synchronous detector output $V_2$ in the adder 28. The composite cosine component Vs which is the output of the adder 28 is expressed by the following equation:

$$V_s = V_2 + K_m \cdot V_4. \qquad (28)$$

Now, pre-adjusting the gains $K_{A3}$ and $K_{A4}$ such that $K=K_{A2}\cdot K_{pd}=K_{A4}\cdot K_{pd}$, Eq. (28) is expressed by the following equation using Eqs. (26) and (27):

$$V_s = I_o K[J_2(X) + K_m J_4(X)]\cos\Delta\Phi_s \qquad (29)$$
$$= I_o K \cdot F(X)\cos\Delta\Phi_s.$$

Now, calculating the bracketed value F(X) in Eq. (29) with $K_m$ set to 2.06, it is maximum at the position where X=4.20 as indicated by the curve F(X) in FIG. 9 and the value F(X) is stable with respect to a variation in X at the peak of the curve. That is, the Bessel function $J_3(X)$ which is used in the FOG output also becomes maximum at the same position as that where the value F(X) is maximum. Accordingly, the composite cosine component Vs given by Eq. (29) can be used as a $\cos\Delta\Phi_s$ component stable with respect to the value X in the fiber optic gyro which has an operating point of X=4.20. The output Vs of the adder 28, which is stable with respect to the value X, is differentially operated by the differential amplifier 31 with the reference voltage $V_R$ from the reference voltage generator 32. The output Ve of the differential amplifier 31 is given as follows:

$$Ve = V_R - Vs \qquad (30)$$
$$= V_R - I_oK \cdot F(X) \cdot \cos\Delta\Phi_s.$$

The output Ve of the differential amplifier 31 is applied to the integrating filter 33 and its output is fed to the light source driver 23 to control the quantity of light I that is emitted from the light source 11. Assuming that $V_R = I_oK.F(X) = K_R$ is set at the initial stage, the output Ve given by Eq. (30) is zero when no input angular rate is being applied to the optical fiber coil 15, that is, the phase difference $\Delta\Phi_s$ between the CW and CCW light beams in the optical fiber coil 15 is zero. Now, suppose that the quantity of light $I_o$ which reaches the photodetector 17 has been decreased owing to an ambient temperature change. In such an instance, the output Ve becomes a positive voltage. Let it be assumed that the integrating filter 33 yields a positive integrated voltage when supplied with the positive voltage. The light source driver 23 is so constructed as to increase the quantity of light from the light source 11 by the application of the positive integrated voltage, and it is controlled so that the input to the integrating filter 33, that is, the output Ve of the differential amplifier 31 is always zero. In consequence, the following equation holds:

$$V_R = I_oK.F(X).\cos\Delta\Phi_s. \qquad (31)$$

Hence, by setting $K = K_{pd}.K_{A3}$ and substituting the relationship of Eq. (31) and the relationship of $I_o = K_{op}I$ into Eq. (25), the FOG output $V_3$ is expressed as follows:

$$V_3 = \{V_R J_3(X)/[F(X) \cdot \cos\Delta\Phi_s]\}\sin\Delta\Phi_s \qquad (32)$$
$$= \{V_R J_3(X)/F(X)\}\tan\Delta\Phi_s \qquad (33)$$

As is evident from Eq. (32), the FOG output $V_3$ does not include the term of the quantity of light $I_o$ reaching the photodetector 17 nor does it include the gains $K_{A2}$, $K_{A3}$, $K_{A4}$, $K_{op}$, $K_{pd}$, etc. which have temperature dependence. In addition, since the value X is also fixed as referred to previously, it is possible to offer a fiber optic gyro which has a scale factor stable with respect to ambient temperature changes.

Figure 10:
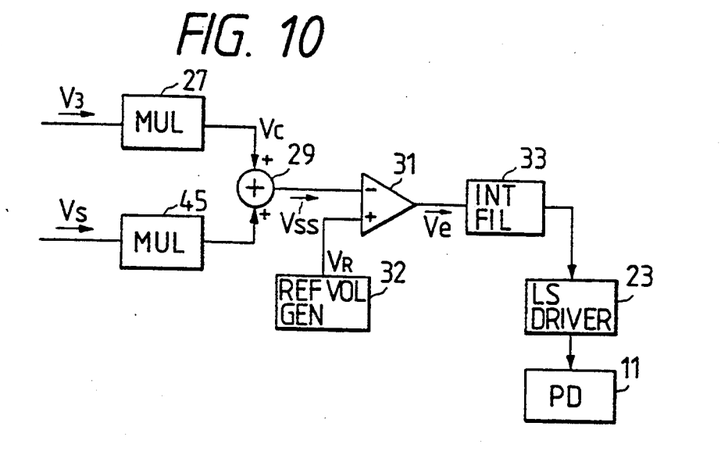
FIG. 10 is a block diagram illustrating the principal part of a modified form of the FIG. 8 embodiment.

Incidentally, in the construction of FIG. 8, since the FOG output $V_3$ is obtained as a value proportional to the $\tan\Delta\Phi_s$ component as expressed by Eq. (33), the linearity of the FOG output with respect to the input angular rate $\Omega$ is particularly poor when the input angular velocity is large. FIG. 10 shows the principal part of a modified form of the FIG. 8 embodiment which is intended to improve the linearity of the FOG output.

In the construction depicted in FIG. 10, the FOG output $V_3$ and the output Vs of the adder 28 in FIG. 8 are squared by multipliers 27 and 45, respectively, and their outputs are added together by the adder 29. The multiplier 27 performs the function of the correcting signal generator 27 in the FIG. 7 embodiment and squares the FOG output $V_3$ and outputs it as the correcting signal Vc. The output Vss of adder 29 is expressed by the following equation:

$$Vss = Ks^2(\sin^2\Delta\Phi_s + \cos^2\Delta\Phi_s) = Ks \qquad (34)$$

In this case, the respective gains are initialized such that $$I_oK_{pd}K_{A3}J_3(X) = I_oK\{J_2(X) + K_mJ_4(X)\} \qquad (35)$$
$$= I_oK \cdot F(X) = Ks.$$

The output Vss of the adder 29 is compared by the differential amplifier 31 with the reference voltage $V_R$ from the reference voltage generator 32, and the resulting error signal Ve is fed to the integrating filter 33. The output of the integrating filter 33 is supplied to the light source driver 23 to form a negative feedback control loop so that the error Ve is reduced to zero, providing $Ks^2 = V_R$. As a result, by substituting Eq. (35) into Eq. (25), the FOG output $V_3$ can be expressed as follows:

$$V_3 = Ks \cdot \sin\Delta\Phi_s = \sqrt{V_R} \cdot \sin\Delta\Phi_s \qquad (36)$$

As can be seen from Eq. (36), the FOG output $V_3$ is stabilized independently of the quantity of light $I_o$. In addition, the $\sin\Delta\Phi_s$ component is higher than the $\tan\Delta\Phi_s$ component in the accuracy of approximation to the value of the phase difference $\Delta\Phi_S$ and provides the FOG output of an excellent linearity. Hence, the FOG output obtainable with the FIG. 10 embodiment is more excellent in linearity than the FOG output in the FIG. 8 embodiment which is expressed by Eq. (33).

Figure 11:
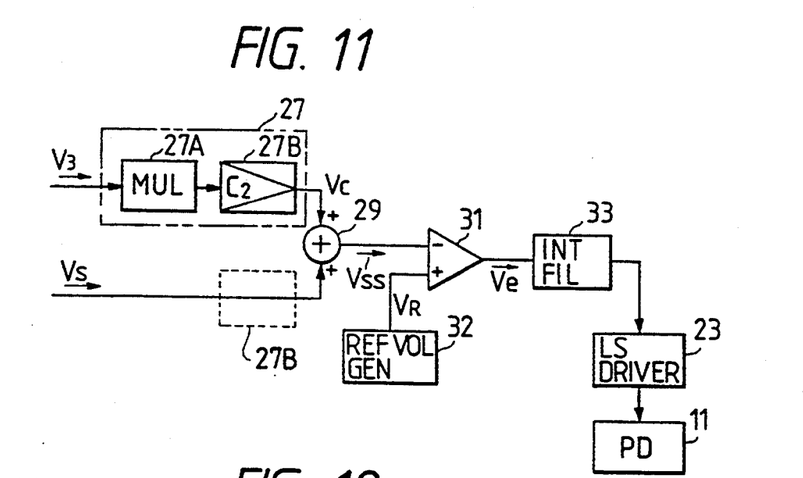
FIG. 11 is a block diagram illustrating the principal part of another modified form of the FIG. 8 embodiment.

FIG. 11 illustrates the principal part of another modification corresponding to the FIG. 10 embodiment. As in the case of FIG. 7, the FOG output $V_3$ is squared by the multiplier 27A and the multiplied output is amplified by a factor $C_2$ in the amplifier 27B to obtain the signal Vc, which is applied as a correcting signal to the adder 29, wherein it is added to the composite cosine component Vs from the adder 28 (FIG. 8). The output Vss of the adder 29 is expressed by the following equation:

$$Vss = Vs + C_2 \cdot V_3^2. \qquad (37)$$

By pre-adjusting and setting respective gains so that Eq. (35) holds as is the case with FIG. 10, Eq. (37) is expressed as follows:

$$Vss = Ks(C_2Ks.\sin^2\Delta\Phi_s + \cos\Delta\Phi_s). \qquad (38)$$

The output Vss from the adder 29 is compared by the differential amplifier 31 with the reference voltage $V_R$ from the reference voltage generator 32, and the resulting error signal Ve is fed to the integrating filter 33. The output of the integrating filter 33 is supplied to the light source driver 23 to form the negative feedback control loop, providing $Vss = V_R$. Eq. (38) is solved in the same manner as in the case of Eq. (21) in the embodiment of FIG. 7, and consequently, the FOG output $V_3$ is also expressed in the same manner as in the case of Eq. (23) and its linearity is also expressed as is the case with Eq. (24).

Figure 12:
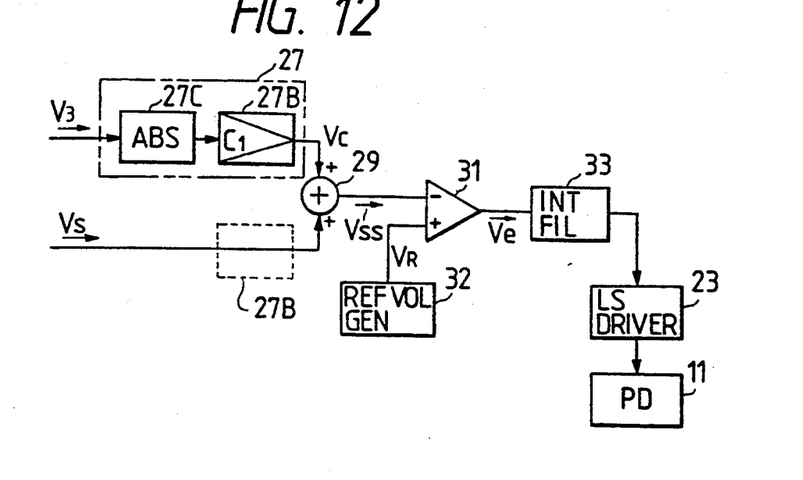
FIG. 12 is a block diagram illustrating the principal part of still another modified form corresponding to the FIG. 11 embodiment.

FIG. 12 illustrates in block form the principal part of still another modification corresponding to the FIG. 11 embodiment. The correcting signal generator 27 is comprised of an absolute value circuit 27C and an amplifier 27B, and only the first-order term $C_1V$ in Eq. (7) is used. The FOG output $V_3$ is rendered by the absolute value circuit 27A into an absolute value, which is amplified by a factor of $C_1$ in the amplifier 27B to obtain the correcting signal Vc. The correcting signal Vc and the output Vs from the adder 28 (FIG. 8) are added together by the adder 29. The output Vss of the adder 29 is expressed by the following equation:

$$V_{ss} = V_s + C_1/V_3/. \qquad (39)$$

By pre-adjusting and setting respective gains so that Eq. (35) holds as in the case of the FIG. 10 embodiment, Eq. (39) is given as follows:

$$V_{ss} = K_s(C_1/\sin\Delta\Phi_s/ + \cos\Delta\Phi_s). \qquad (40)$$

The output $V_{ss}$ from the adder 29 is compared by the differential amplifier 31 with the reference voltage $V_R$ from the reference voltage generator 32 as in the above, and the resulting error signal Ve is provided to the integrating filter 33. The output of the integrating filter 33 is applied to the light source driver 23, establishing a feedback control loop which operates so that the error signal Ve is reduced to zero. Accordingly, the FOG output $V_3$ is expressed by the following equation:

$$V_3 = \{V_R/(C_1/\sin\Delta\Phi_s/ + \cos\Delta\Phi_s)\}\sin\Delta\Phi_s. \qquad (41)$$

As will be appreciated from Eq. (41), also in this embodiment the FOG output has nothing to do with the quantity of light $I_o$, and hence the scale factor is stable. Moreover, the linearity can be improved by a suitable selection of the coefficient $C_1$.

In the embodiments of FIGS. 8, 10, 11 and 12 the output of the integrating filter 33 is fed back to the light source driver 23, but the same results as those described above could also be obtained by employing a construction wherein the automatic gain control circuit 39 is disposed at the output stage of the photodetector 17 as indicated by the broken line in FIG. 8 and the output of the integrating filter 33 is fed back to the automatic gain control circuit 39 to control its gain. In the embodiments of FIGS. 11 and 12 the amplifier 27B may also be inserted in the path of the signal Vs as indicated by the broken line.

In the above-described embodiments the optical couplers 12 and 14 and the phase modulator 16 may also be formed by optical IC's.

As described above, according to the first aspect of the present invention, the sine and cosine components of the Sagnac phase difference $\Delta\Phi_s$ are detected from the output of the photodetector 17, the sine component is provided as the FOG output, a correcting signal is derived from the sine component, the cosine component is used to form a feedback loop for stabilizing the scale factor, and the correcting signal is introduced into the feedback loop. By this, the linearity of the FOG output can be improved. According to the second aspect of the present invention, the sine component and two cosine components of the Sagnac phase difference $\Delta\Phi_s$ in the output of the photodetector 17 are detected and the sine component is used as the FOG output. On the other hand, by controlling the modulation index of the phase modulator 16 so that the two cosine components are equal to each other, the variable X of the Bessel function is fixed at a constant value, and by adding the two cosine components at a predetermined ratio, the composite cosine component is produced. The composite cosine component is used to form the feedback loop for stabilizing the scale factor, by which it is possible to make the scale factor stable with respect to a temperature change.

It will be apparent that many modifications and variations may be effected without departing from the scope of the novel concepts of the present invention.

What is claimed is:

1. An optical-interference type angular velocity sensor comprising:
   an optical path forming at least one loop;
   branch means for splitting a light beam from light source means into two beams that propagate through said optical path as clockwise and counterclockwise light beams;
   interference means for effecting an interference between the clockwise and the counterclockwise light beams that have propagated through said optical path;
   phase modular means disposed in cascade between said branch means and one end of said optical path, for phase modulating the clockwise and the counterclockwise light beams;
   photodetector means for detecting the intensity of the interfered light produced by said interference means and providing an electrical signal representative of said intensity;
   first demodulator means for demodulating, from said electrical signal, a sine component of a Sagnac phase difference $\Delta\Phi_s$ which is caused by an angular velocity applied to said optical path around its axis to obtain an output of said angular velocity sensor, from which output said angular velocity is detected;
   second demodulator means for demodulating a cosine component of said Sagnac phase difference $\Delta\Phi_s$ from said electrical signal;
   means for generating a scale factor stabilizing signal on the basis of said cosine component from said second demodulator means;
   correcting signal generating means for generating a correcting signal for use in improving the linearity of the output of said angular velocity sensor, said correcting signal being generated on the basis of an integral expression in which said sine component from said first demodulator means is used as a variable;
   adder means for adding said correcting signal to said scale factor stabilizing signal;
   reference signal generating means for generating a reference signal;
   comparator means for comparing the output of said adder means with said reference signal and for generating an error signal; and
   feedback loop means for controlling the level of said electrical signal applied to said first and second demodulator means so that said error signal is reduced to zero.

2. The angular velocity sensor of claim 1, wherein said scale factor stabilizing signal generating means is means for generating the squared sum of said cosine and sine components and for providing it to said adder means.

3. The angular velocity sensor of claim 1 wherein said integral expression for generating said correcting signal is a polynomial of n-th degree of said sine component in which said sine component is used as a variable, wherein $n = 1, 2, 3, \ldots$.

4. The angular velocity sensor of claim 3 wherein said correcting signal is generated by finding a coefficient for each term of said polynomial by use of a least squares method and by multiplying the maximum coefficient among the coefficients found by n-th power of said sine component of the term having said maximum coefficient.

5. The angular velocity sensor of claim 3 wherein said correcting signal is generated by finding a coefficient for each term of said polynomial by use of a least squares method.

6. The angular velocity sensor of claim 3 wherein said correcting signal is generated by finding a coefficient for each term of said polynomial by use of a least squares method and by multiplying the coefficient found for one term of said polynomial by the absolute value of the n-th power of said sine component of said one term.

7. The angular velocity sensor of claim 1, wherein said light source means includes a light source for emitting said light and a light source driver for driving said light source, and said feedback loop is means for controlling said light source driver on the basis of said error signal to thereby control the quantity of light that is emitted from said light source.

8. The angular velocity sensor of claim 1, wherein said feedback loop means includes gain control means inserted at the output side of said photodetector means, said feedback loop means being means for controlling said gain control means on the basis of said error signal to thereby control the level of the output electrical signal of said photodetector means.

9. An optical-interference type angular velocity sensor wherein light from light source means is branched by branch means into clockwise and counterclockwise light beams for propagation through an optical path forming at least one loop, said clockwise and counterclockwise light beams, after having propagated through said optical path, are caused by interference means to interfere with each other, said clockwise and counterclockwise light beams are phase modulated by phase modulator means disposed between said branch means and one end of said optical path, the intensity of the interference light is detected by photodetector means as an electrical signal, and a sine component of a Sagnac phase difference $\Delta\Phi_s$ which is caused by an angular rate applied to said optical path around its axis is demodulated by sine component demodulator means from said electrical signal, thereby detecting said angular rate, said optical-interference type angular rate sensor comprising:

first and second cosine component demodulator means for demodulating first and second cosine components of said Sagnac phase difference $\Delta\Phi_s$ from said electrical signal;

first subtractor means for calculating the difference between said first and second cosine components;

modulation control loop means for controlling, on the basis of the output of said first subtractor means, a modulation index of said phase modulator means so that said first and second cosine components become equal to each other;

cosine component combine means for combining said first and second cosine components at a predetermined ratio into a composite cosine component;

comparator means for comparing a signal corresponding to said composite cosine component with a predetermined reference value for generating an error signal; and level control feedback loop means whereby the level of said electrical signal which is applied to said first and second cosine component demodulator means and said sine component demodulator means is controlled so that said error signal is reduced to zero.

10. The angular velocity sensor of claim 9, which further comprises correcting signal generating means for generating a correcting signal on the basis of said sine component and adder means for adding said correcting signal to a signal corresponding to said composite cosine component and for providing the added output to said comparator means.

11. The angular velocity sensor of claim 10, wherein said correcting signal generating means is means for outputting the square of said sine component as said correcting means and said adder means is means for adding the square of said composite cosine component, as a signal corresponding to said composite cosine component, to said correcting signal.

12. The angular velocity sensor of claim 10, wherein said correcting signal generating means includes means for generating the square of said sine component and said adder means is means for adding the square of said sine component and said composite cosine component at a predetermined ratio and for applying the added output to said comparator means as a signal corresponding to said composite cosine component.

13. The angular velocity sensor of claim 10, wherein said correcting signal generating means includes absolute value means for generating the absolute value of said sine component and said adder means is means for adding the output of said absolute value means and said composite cosine component at a predetermined ratio and for applying the added output to said comparator means as a signal corresponding to said composite cosine component.

14. The angular velocity sensor of claim 9 or 10, wherein said light source means includes a light source for emitting said light and a light source driver for driving said light source and said level control feedback loop means is means for controlling said light source driver on the basis of said error signal to thereby control the quantity of light that is emitted from said light source.

15. The angular velocity sensor of claim 9 or 10, wherein said level control feedback loop means includes gain control means inserted at the output side of said photodetector means, said level control feedback loop means being means for controlling said gain control means on the basis of said error signal to thereby control the level of the output electrical signal of the photodetector means.

16. The angular velocity sensor of claim 9 or 10, wherein said first and second cosine components are second and fourth harmonic components of a phase modulation frequency, said sine component is a third harmonic component of said phase modulation frequency and said cosine component combine means is means for adding said first and second cosine components in the ratio 1:2.06 to obtain said composite cosine component.

* * * * *